United States Patent [19]

Yoshimura et al.

[11] Patent Number: 4,972,727
[45] Date of Patent: Nov. 27, 1990

[54] TORQUE MEASURE DEVICE

[75] Inventors: Shigeo Yoshimura; Renshiro Ishino; Shiro Takada, all of Hirakata; Hitoshi Kimura, Yao, all of Japan

[73] Assignee: Kubota Ltd., Osaka, Japan

[21] Appl. No.: 439,344

[22] Filed: Nov. 20, 1989

Related U.S. Application Data

[62] Division of Ser. No. 260,990, Oct. 21, 1988, Pat. No. 4,920,809.

[30] Foreign Application Priority Data

Dec. 28, 1987 [JP] Japan ................... 62-334861
Dec. 28, 1987 [JP] Japan ................... 62-334862
Dec. 28, 1987 [JP] Japan ................... 62-334863
Dec. 28, 1987 [JP] Japan ................... 62-334864

[51] Int. Cl.$^5$ ............................... G01L 3/10
[52] U.S. Cl. ............................... 73/862.36
[58] Field of Search ........................ 73/862.36

[56] References Cited

FOREIGN PATENT DOCUMENTS 0206421 9/1987 Japan ................... 73/862.36
0667836 6/1979 U.S.S.R. ............... 73/862.36

Primary Examiner—Charles A. Ruehl
Attorney, Agent, or Firm—Joseph W. Farley

[57] ABSTRACT

A device for measuring torque in a shaft without contacting the latter. A torque transmitting shaft is formed with at least one detecting magnetically anisotropic region inclined to form an angle with respect to the axis of rotation of this shaft. A detecting coil is disposed on the periphery of the detecting magnetically anisotropic region. When the detecting voltage for the detecting coil changes owing to temperature changes and time-dependent changes, the changes in the detection sensitivity and in the zero point take place, leading to errors during torque measurement. Correct measured values can be obtained by having a device for correcting such changes in sensitivity and zero point.

9 Claims, 10 Drawing Sheets $T = k(V_1' - V_2')$ $T = k(V_1' - V_2')$

TORQUE MEASURE DEVICE

This is a divisional of copending application Ser. No. 07/269,990 filed Oct. 21, 1988, now U.S. Pat. No. 4,920,809.

FIELD OF THE INVENTION

The present invention relates to a torque measuring device and particularly to a torque measuring device capable of non-contact measurement of torque in the shafts of engines, motors, industrial machines and the like.

BACKGROUND OF THE INVENTION

This type of torque measuring device is disclosed in Japanese Patent No. 169326. In this device, a shaft having soft magnetic and magnetostrictive properties is formed on its outer periphery with a pair of knurled regions inclined in opposite directions to form angles of 45 degrees with respect to the axis of rotation of the shaft, each knurled region having an exciting coil and a detecting coil wound along the outer periphery thereof.

According to such arrangement, the knurled regions provide magnetic anisotropy, and a change in permeability occurring in each knurled region according to transmission torque is detected by the detecting coil. At this time, when a compressive force acts on one of the knurled regions in the knurling direction, a tensile force acts on the other knurled region since the knurled regions are inclined in opposite directions. As a result, the detection voltage on one of the detecting coils increases with increasing torque while the detection voltage on the other detecting coil decreases. If the detection voltages on these detecting coils are differentiated, a torque detection voltage indicating a change in torque can be obtained.

Another conventional torque detecting device is disclosed in Japanese Patent Application Laid-Open Specification No. 59-166827. In this device, instead of forming the knurled regions shown in aforesaid Japanese Patent No. 169326, amorphous soft magnetic layers inclined in opposite directions are formed on the surface of a rotary shaft by bonding, plating or the like. According to such arrangement, measurement of torque is possible also concerning a shaft having no magnetostrictive property.

With these conventional arrangements, however, the balance of detection voltages outputted from the two detecting coils with no transmission torque being imposed tends to change owing to temperature changes and time-dependent changes. This is due to changes in magnetic properties (permeability and magnetostriction factor) of the material of the shaft and changes in iron loss caused by magnetic lines passing through the shaft surface; and variations in the quality of exciting coils, detecting coils and magnetic layers on the shaft according to material and manufacture. As a result, the sensitivity, the zero point (output value when the torque is zero) and the like changes causing error in measured torque values.

DISCLOSURE OF THE INVENTION

With the above in mind, an object of the invention is to prevent error from being produced in measured torque values owing to changes in the balance, zero point and sensitivity.

To achieve this object, a first aspect of the invention is directed to an arrangement comprising:

torque detecting mean having first and second torque detecting magnetically anisotropic regions formed on the outer peripheral surface of a torque transmitting shaft and provided with magnetic anisotropy such that the regions are inclined in opposite directions to form angles with respect to the axis of rotation of said shaft, and first and second detecting coils capable of detecting changes in permeability in the torque detecting magnetically anisotropic regions, correcting means having first and second correcting magnetically anisotropic regions, with magnetic anisotropy imparted thereto in a direction parallel with the axis of rotation of said shaft, formed on the outer peripheral surface of said shaft in the vicinity of said first and second torque detecting magnetically anisotropic regions, and first and second correcting coils capable of detecting changes in permeability in the correcting magnetically anisotropic regions.

According to such arrangement, the correcting magnetically anisotropic regions have magnetic anisotropy imparted thereto in a direction parallel with the axis of rotation of the shaft, and the outputs from the correcting coils are hardly influenced by the torque in the shaft; thus, only those outputs which are related to permeability and magnetostriction factor can be delivered. Since such correcting magnetically anisotropic regions and correcting coils are installed in the vicinity of the torque detecting magnetically anisotropic regions and detecting coils, respectively, different errors can be separated from the torque detection data and then corrected.

A second aspect of the invention is directed to an arrangement comprising:

torque detecting means having first and second torque detecting magnetically anisotropic regions formed on the outer peripheral surface of a torque transmitting shaft and provided with magnetic anisotropy such that the regions are inclined in opposite directions to form angles with respect to the axis of rotation of said shaft, and first and second detecting coils capable of detecting changes in permeability in the torque detecting magnetically anisotropic regions, and correcting means having a correcting shaft separate from said torque transmitting shaft and free from load, and first and second correcting coils, installed around the correcting shaft, wherein said correcting means having substantially the same magnetic properties as said torque detecting means and installed in the vicinity of said torque detecting means.

According to such arrangement, the correcting shaft is never loaded since it is separated from the torque transmitting shaft. Therefore, by detecting the outputs from the two correcting coils and controlling an exciting AC source so as to make their detection voltage constant, the various errors occurring at the time of torque detection and caused by temperature changes and time-dependent changes can be corrected while being hardly influenced by torque signal.

A third aspect of the invention is directed to an arrangement, comprising:

first and second magnetically anisotropic region formed on the outer peripheral surface of a torque transmitting shaft and provided with magnetic anisotropy such that the regions are inclined in opposite directions to form angles with respect to the axis of rotation of said shaft, first and second detecting coils capable of detecting changes in permeability in said magnetically anisotropic regions, and control means ensuring that the detection signal values from the two detecting coils when no torque acts on said shaft are equal to each other.

According to such arrangement, the shifting of the balance between the two detecting sections due to temperature changes and time-dependent changes can be eliminated by the control means without being influenced by torque acting on the shaft, and production of error due to said shifting can be prevented.

A fourth aspect of the invention is directed to an arrangement comprising:

a torque detecting magnetically anisotropic region provided with magnetic anisotropy such that the region is inclined to form an angle with respect to the axis of rotation of a torque transmitting shaft, a correcting magnetically anisotropic region formed on the outer peripheral surface of the shaft in the vicinity of the torque detecting magnetically anisotropic region and provided with magnetic anisotropy in a direction parallel with the axis of rotation of the shaft, a detecting coil and a correcting coil installed along said torque detecting magnetically anisotropic region and said correcting magnetically anisotropic region, respectively, and means for correcting the exciting voltage applied for said correcting coil to ensure that the measured data provided by said correcting coil is equal to a certain reference value and for controlling the exciting voltage applied for said detecting coil correspondingly to the control of said exciting voltage for the correcting coil.

According to such arrangement, since the exciting voltage for the correcting coil is controlled so that the measured data is equal to a certain reference value and since the exciting voltage for the detecting coil is controlled in conjunction therewith, the detection sensitivity is kept at a constant level. As a result, the gradient of the detection voltage and the output level under constant torque load are kept constant; thus, the torque detecting sensitivity is prevented from changing. In this case, since the correcting magnetically anisotropic region is formed to extend parallel with the axis of the shaft, the output from the correcting coil is not influenced by the torque acting on the shaft. Therefore, the measured data provided by the correcting coil is controlled to a constant value irrespective of the presence and amount of the torque load on the shaft and time-dependent changes and temperature changes in the magnetic properties of the shaft; thus, the detecting coil sensitivity is maintained at a constant level.

DESCRIPTION OF THE EMBODIMENTS

First Embodiment

Figure 1:
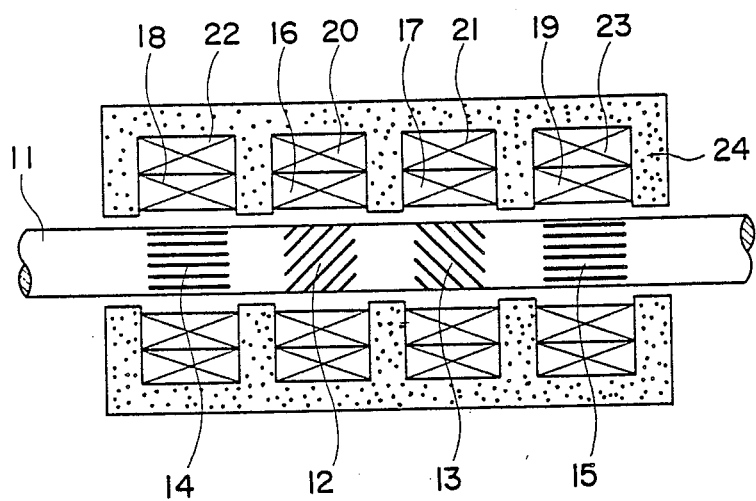
FIG. 1 is a schematic view of a torque measuring device according to a first embodiment of the invention.

In FIG. 1, the numeral 11 denotes a torque transmitting shaft for the output of an engine to a working apparatus. The outer peripheral surface of the shaft 11 is formed with torque transmitting magnetically anisotropic regions 12 and 13 provided with magnetic anisotropy such that it is inclined in opposite directions to form angles of 20–60 degrees, preferably 45 degrees with respect to the axis of rotation of the shaft 12, and axially spaced a predetermined distance from each other. These detecting magnetically anisotropic regions 12 and 13 as described above, can be formed by knurling the outer peripheral surface of the shaft 11 or by forming amorphous ferromagnetic layers on the surface of the shaft 11 by bonding, plating or other method.

At positions axially spaced from each other and across said torque detecting magnetically anisotropic regions 12 and 13, there are provided correcting magnetically anistropic regions 14 and 15 formed on the outer peripheral surface of the shaft 11 in the vicinity of said torque detecting magnetically anisotropic regions 12 and 13. These correcting magnetically anIsotropic regions 14 and 15 are provided with magnetic anisotropy in a direction parallel with the axis of rotation of the shaft 11 and are created by the axial magnetic anisotropy formation using the same process, such as knurling or amorphous layer formation, as in the torque detecting magnetically anisotropic regions 12 and 13.

Exciting coils 16, 17, 18 and 19 are positioned around the outer peripheries of the magnetically anisotropic regions 12, 13, 14 and 15. Disposed on the respective outer sides of the exciting coils 16, 17, 18 and 19 are detecting coils 20 and 21 associated with the torque detecting magnetically anisotropic regions 12 and 13 and correcting coils 22 and 23 associated with the correcting magnetically anistropic regions 14 and 15. The numeral 24 denotes a core made of a ferromagnetic material such as silicon steel sheet or ferrite and defining a passage for magnetic flux and also serving as a casing for accommodating the coils 16 through 23.

Figure 2:
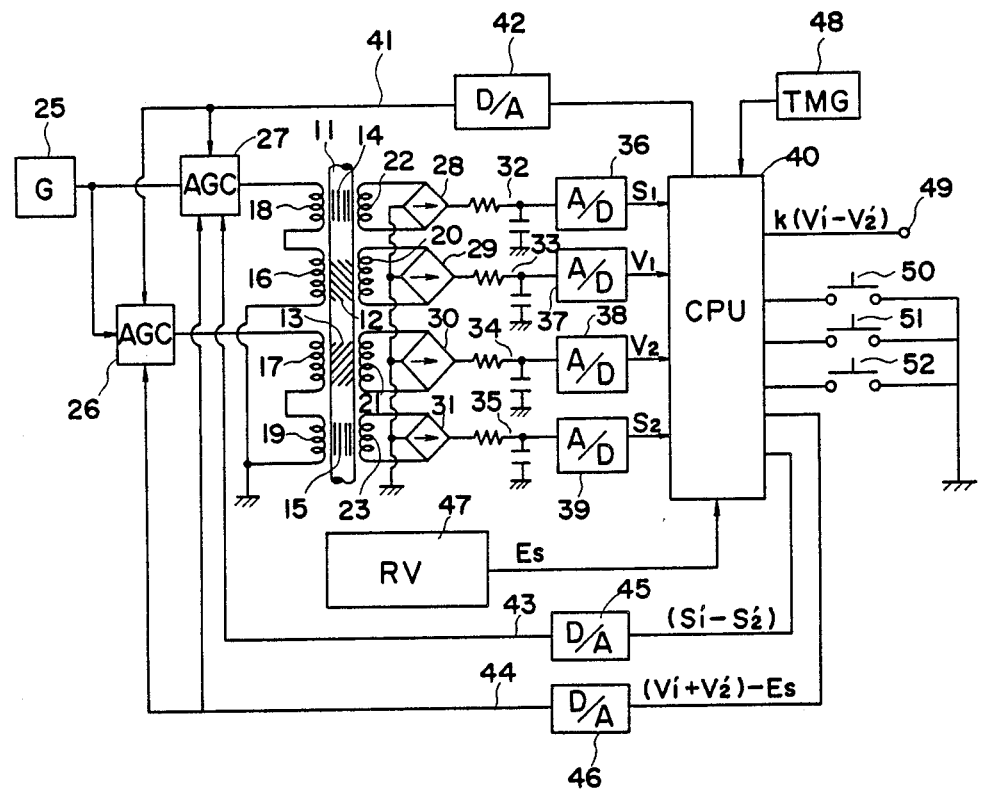
FIG. 2 is a block diagram showing the torque measuring device of FIG. 1 together with an electronic circuit for torque measurement.

FIG. 2 shows a torque measuring circuit. In this figure, the numeral 25 denotes an oscillator connected to a first AC power source 26 in the form of a power amplifier. Connected to the output terminal of the oscillator 25 in parallel with the first power source 26 is the input terminal of a second power source 27 also in the form of a power amplifier. The exciting coils 16 and 18 are combined in series and connected to the second power source 27, while the exciting coils 17 and 19, also connected in series, are connected to the first power source 26. The detecting coils 20 and 21 and the correcting coils 22 and 23 are connected to a CPU 40 respectively through rectifiers 28, 29, 30 and 31, filters 32, 33, 34 and 35 each formed of a resistor and a capacitor, and AD converters 36, 37, 38 and 39.

A power source cut-off signal line 41 for cutting off the outputs of the two power sources 26 and 27 is connected, together with an DA converter 42, to the CPU 40. Also connected to the CPU 40 are power source controlling signal lines 43 and 44 for adjusting the amplification factors of the power amplifiers constituting the two power sources 26 and 27 to control their outputs. The numerals 45 and 46 denote DA converters placed in the signal lines 43 and 44. The numeral 47 denotes a reference value setting device adapted to transfer a reference value Es digitally set or softwarewise set to the CPU 40. Further, the CPU 40 has a timing circuit 48 connected thereto to set the operation timing for the present circuit. The numeral 49 denotes an output terminal of a torque signal. The numerals 60, 61 and 52 denote manual switches used to correct various errors, as will be later described, irrespectively of the operation timing for the present circuit.

The operation based on the above arrangement will now be described. When the power sources 26 and 27 are turned on, output voltages appear in the detecting coils 20 and 21 and the correcting coils 22 and 23, said voltages taking values $V_1$, $V_2$, $S_1$ and $S_2$ on the output side of the AD converters 37, 38, 36 and 39, i.e., the input side of the CPU 40. Further, these values are arithmetically processed in the CPU 40 to be converted into values $V_1'$, $V_2'$, $S_1'$ and $S_2'$.

Figure 3:
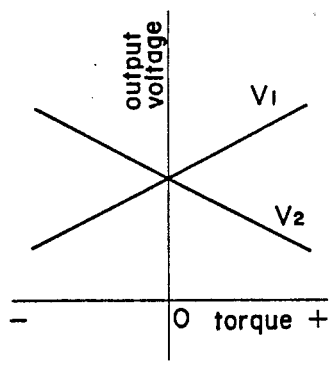
FIG. 3 is a graph showing detected voltages from detecting coils when there is no error.
Figure 4:
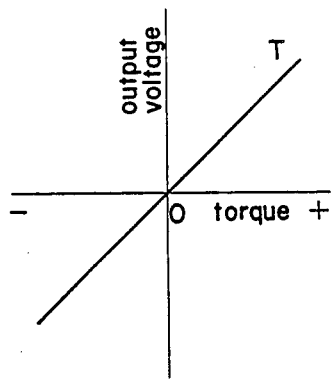
FIG. 4 is a graph showing a torque signal based on FIG. 3.

When a torque acts on the shaft 11, the output voltages from the detecting coils 20 and 21, after passing through the AD converters, are $V_1$ and $V_2$ shown in FIG. 3. These values $V_1$ and $V_2$ are processed in the CPU 40, as will be later described, and thereby converted into values $V_1'$ and $V_2'$. The difference $(V_1'-V_2')$ is multiplied by a suitable value k, and the value $k(V_1'-V_2')$ is outputted as a torque signal from the output terminal 49. FIG. 4 shows an example of a torque signal T based on the outputs $V_1$ and $V_2$ of FIG. 3.

Errors due to temperature changes and time-dependent changes are corrected as follows.

First, the zero point adjustment is made. To this end, the outputs from the two power sources 26 and 27 are cut off with predetermined timing, for example, once in every 1 minute, through the power source cut-off signal line 41. Then, since the exciting voltages for the exciting coils 16, 17, 18 and 19 become zero, the output voltages from the detecting coils 20 and 21 and the correcting coils 22 and 23 become also zero. Therefore, if &he outputs from the AD converters 36, 37, 38 and 39 have values other than zero, for example, $V_1=\epsilon_1$, $V_2=\epsilon_2$, $S_1=\delta_1$ and $S_2=\delta_2$, then these errors are due to some causes, such as temperature drift in the electronic circuit. Thus, calibration is made by the CPU 40 through arithmetic operation so that $V_1'=V_1-\epsilon_1$, $V_2'=V_2-\epsilon_2$, $S_1'=S_1-\epsilon_1$ and $S_2'=S_2-\epsilon_2$. When the arithmetic operation for the zero point correction is completed, $V_1'=V_2'=S_1'=S_2'=0$. And with the timing which follows the completion of the zero point adjustment, new data $V_1'$, $V_2'$, $S_1'$ and $S_2'$ with the circuit errors $\epsilon_1$, $\epsilon_2$, $\delta_1$ and $\delta_2$ corrected are obtained.

Figure 6:
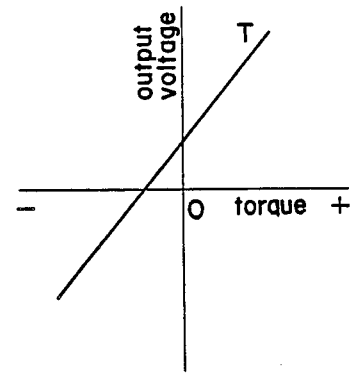
FIG. 6 is a graph showing a torque signal based on FIG. 5.

With the next timing, the balance correction of the two detecting sections and the two correcting sections is made. The balance between the detecting coils 20 and 21 can be upset as the magnetic properties of the shaft are influenced by temperature changes or by long-term alternate torque or as the temperature in the interior of the torque measuring device changes. When the balance between the detecting coils 20 and 21 is upset, the detected voltages $V_1$ and $V_2$ are as shown in FIG. 6, and the torque signal T corresponding thereto changes from the normal state, as shown in FIG. 6; thus, this is corrected.

The difference $S_1'-S_2'$ between the calibrated data $S_1'$ and $S_2'$ of the corrected voltages $S_1$ and $S_2$ is calculated in the CPU 40. And a control signal is fed to the second power source 27 through the power source control signal line 43 and the power source 27 is controlled so that $S_1'-S_2'=0$. Thereby, the exciting voltages for the series-connected exciting coils 16 and 18 are simultaneously adjusted, the outputs $S_1$ and $V_1$ are corrected, and the balance between $S_1$ and $S_2$, that is, the balance between $V_1$ and $V_2$ is simultaneously corrected. As a result, the diagrams shown in FIGS. 3 and 4 are corrected so that a state close to $V_1=V_2$ is established when the torque is zero.

Figure 7:
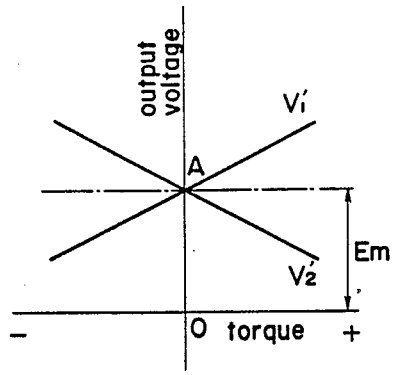
FIG. 7 is a graph showing detected voltages obtained with a predetermined sensitivity.
Figure 8:
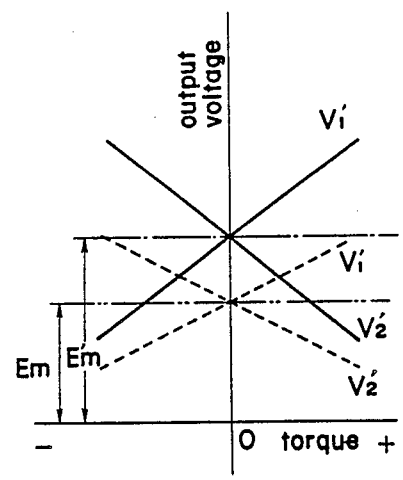
FIG. 8 is a graph showing detected voltages when the sensitivity changes.

Next, sensitivity correction is made. At the aforesaid stage where said balance correction is made, the crossing point A between the output lines for the two signals $V_1'$ and $V_2'$ lies on the zero-torque line, as shown in FIG. 7. However, if the magnetic properties of the shaft change owing to temperature changes, the gradients of the output lines for the two signals $V_1'$ and $V_2'$ (that is, sensitivity) change and so does the average level Em in FIG. 7, with Em changing to Em' as shown in FIG. 8. As a result, the inclination of the torque signal line indicated by $k(V_1'-V_2')$ (see FIG. 4) changes and so does the measurement sensitivity.

Thus, correction is effected to bring Em' back to the predetermined value Em and restore the predetermined inclination to ensure that the sensitivity characteristic is constant.

The sum of the two signals $V_1'+V_2'$ (which is twice the average value), is used as a detected value representing the average value. Control is effected to ensure that this value is equal to the set value Es inputted into the CPU 40 by the reference value setting device 47, that is, $(V_1'+V_2')-Es=0$. Concretely, the first and second power sources 26 and 27 are adjusted by the power source control signal lines 43 and 44 so as to increase or decrease their output levels. Then the two power sources 26 and 27 simultaneously increase or decrease in output level, and control is effected to ensure that $V_1'+V_2'$ is equal to Es without upsetting the balance between the two detecting sections. When the output levels of the two signals $V_1'$ and $V_2'$ are restored to the predetermined Values in this manner, their angles of inclination are also restored to the predetermined values, as shown in broken lines in FIG. 8; thus, the sensitivity correction is completed.

The aforesaid zero point correction, balance correction and sensitivity correction are effected in this order with predetermined timing by the timing circuit 48. For example, with 1 cycle assumed to be 1 minute, the zero point correction is made in the first 50 milliseconds, followed by the balance correction in the next 50 milliseconds, and the sensitivity correction is made at all times, that is, many times in the remaining time. Such cycle is performed repeatedly. During the zero point correction and balance correction, the torque signal at the end of the time of the preceding cycle is outputted from the terminal 49.

In addition to such automatic cyclic operation, manual correction can be made on demand.

For example, if the manual switch 50 for zero point correction is operated, the signal therefrom is taken into the CPU 40 and during the time this switch is being operated, the aforesaid zero point correcting operation is repeatedly performed. At this time, it is possible to inform the operator by a suitable method that the correcting operation is going on. When the switch operation is completed, the measured torque value $k(V_1'-V_2')$ according to the data after correction is outputted.

When the manual switch 51 for balance correction is pressed, the aforesaid balance correcting operation is performed. Such manual operation is performed in the event that although there is no torque load, the balance in &he detection state on both sides is upset so that the torque indication does not become 0, as shown in FIG. 6.

When the manual switch 52 for sensitivity correction is used for manual correction, for example, upon completion of manufacture of the present device, the rated reference and the reference value setting device 47 is adjusted so that the indicated value coincides with the rated value.

As described above, according to the present device, the temperature change, time-dependent change and zero point change of the torque output signal can all be automatically corrected. Particularly, the sensitivity change and zero point change due to temperature change during torque loading can be automatically corrected. Further, the electronic processing circuit is very simple in that only the CPU 40 exists except for the AD converters 36, 37, 38 and 39 and the DA converters 42, 45 and 46. This is due to the fact that the automatic correction of various errors is made by software.

Though not described in the above for the sake of simplicity, the zero point correction at the time of manufacture of the device is made in addition to the zero point correction associated with temperature changes and time-dependent changes. This is made by operating the manual zero correction switch 50 with torque load on the shaft 11 removed, that is, with no torque when the first adjustment of the present device is made, and storing a torque indication value $B_0$ from the torque output terminal 49 due to unbalance between the two detecting sections in a non-volatile memory in the CPU 40. And thereafter, actually, the torque indication value $$k=(V_1'-V_2')-B_0$$

appears at the terminal 49.

Second Embodiment

Figure 11:
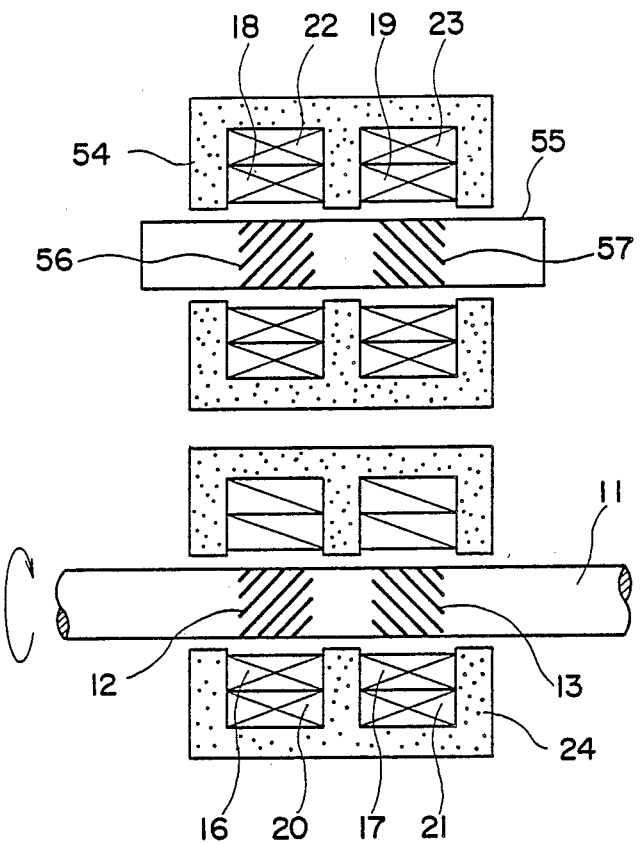
FIG. 11 is a view showing the principal portion of &he shaft shown in FIG. 10 and periphery thereof.

In FIG. 11, the outer peripheral surface of a torque transmitting shaft 11 is provided with a pair of inclined, torque detecting magnetically anisotropic regions 12 and 13 alone unlike the first embodiment.

In the vicinity of the shaft 11, a correcting shaft 55 free from torque is provided in a location where it is subjected to substantially the same environmental conditions including temperature. The outer peripheral surface of this correcting shaft 55 is provided with correcting magnetically anisotropic regions 56 and 57 inclined in opposite directions at an angle of 20-60 degrees, preferably 45 degrees with respect& to the axis of the shaft 58, as in the case of the torque detecting magnetically anisotropic regions 12 and 13 on the shaft 11.

The magnetically anisotropic regions 12, 13, 66 and 57 have exciting coils 16, 17, 18 and 19 disposed around their respective outer peripheries. Further, disposed around the respective outer peripheries of the exciting coils 16, 17, 18 and 19 are detecting coils 20 and 21 associated with the torque detecting magnetically anisotropic regions 12 and 13 and correcting coils 22 and 23 associated with the correcting magnetically anisotropic regions 56 and 57. The numerals 24 and 54 denote cores made of soft magnetic material and providing a passage for the magnetic flux and utilized as a casing for accommodating the coils. The torque detecting section around the shaft 11 and the correcting section around the shaft 55 are manufactured so that they have substantially the same magnetic properties as by providing the magnetically anisotropic regions with the same characteristics.

Figure 10:
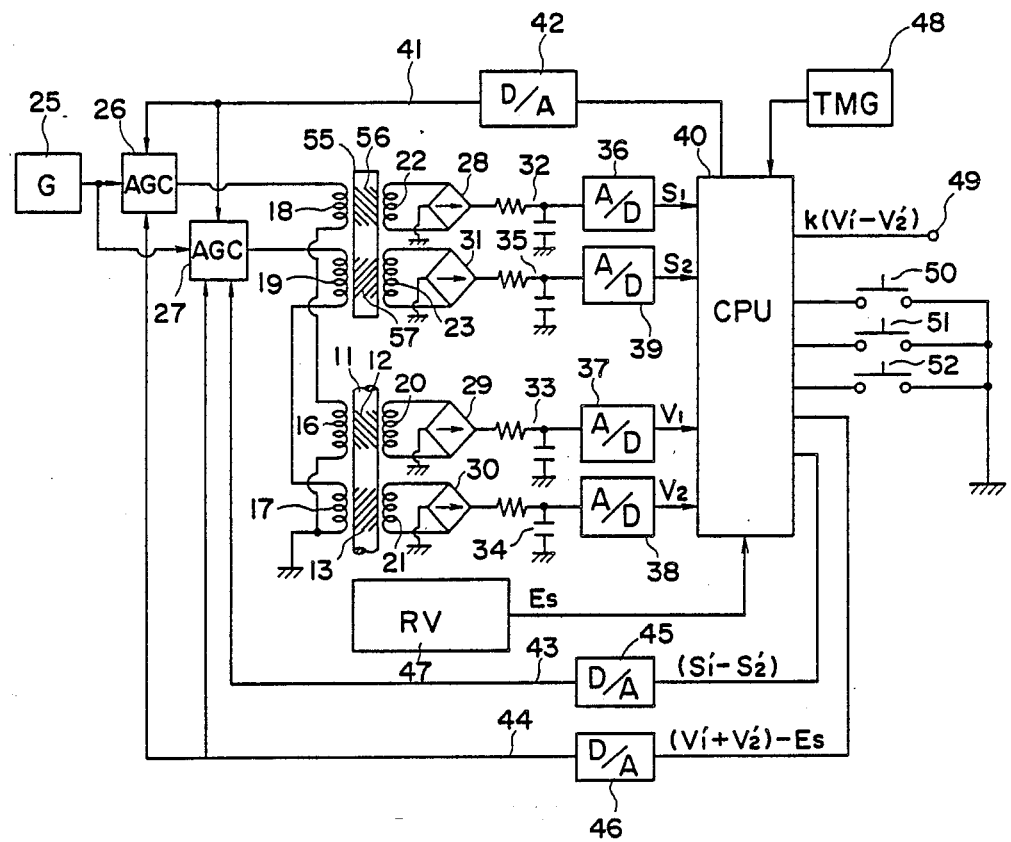
FIG. 10 is a diagram showing the arrangement of a torque measuring device according to a second embodiment of the invention.

FIG. 10 shows the entire arrangement of the present device including an electronic circuit. In this figure, the same members as those shown in FIG. 2 are indicated by the same reference numerals, In this case, however, the exciting coils 16 and 18 are combined in series and connected to a first power source 26, while the exciting coils 19 and 17 are also combined in series and connected to a second power source 27.

Figure 9:
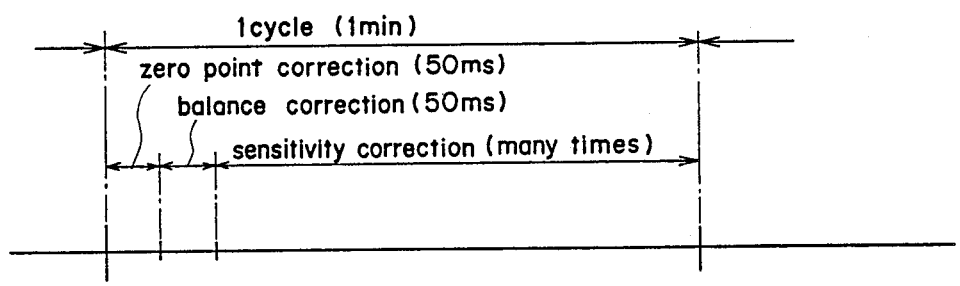
FIG. 9 is an operation timing chart for the circuit shown in FIG. 2.

According to this arrangement, as in the case of the first embodiment, zero point correction, balance correction and sensitivity correction are made with the timing shown in FIG. 9. The details of these corrections are omitted as they are the same as in the first embodiment. The device is also the same in that manual switches 50, 51 and 52 are provided for making said corrections on demand. In this embodiment also, the torque indication value appearing at the torque output terminal 49 is shown in a simplified manner in FIG. 10.

Figure 12:
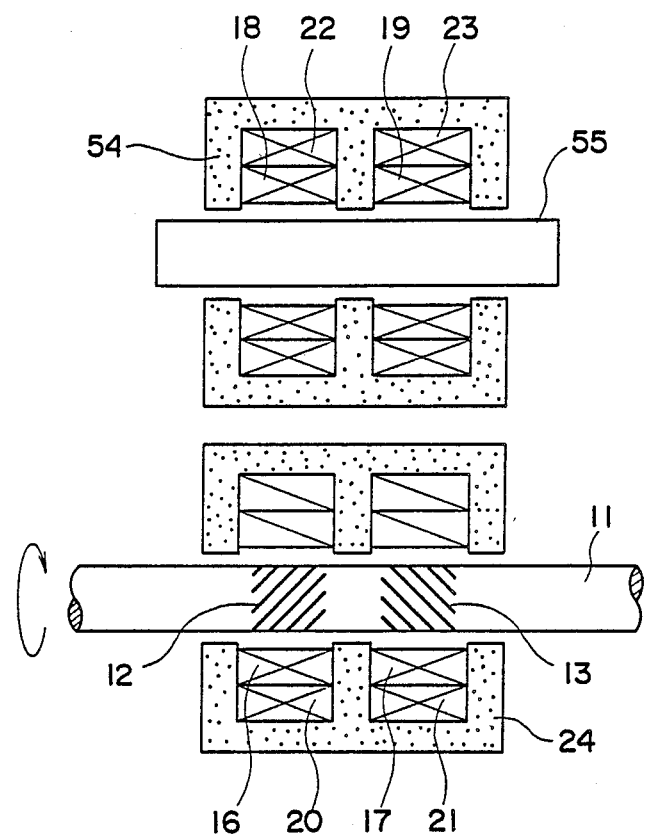
FIG. 12 is a view showing the arrangement of a torque measuring device according to a modification of the second embodiment of the invention.

FIG. 12 shows a device having a modified shaft 55. In this modified example, the shaft 55 has no magnetically anisotropic region formed thereon. Even if the magnetically anisotropic region is omitted, where will be no trouble in practice unless the coincidence between the magnetic properties of the torque detecting section around the shaft 11 and the correcting section around the shaft 55 is degraded. In other words, if changes in the magnetic properties corresponding to temperature changes are substantially the same for both shafts 11 and 55, then the omission of formation of magnetically anisotropic region on the shaft 55 is allowed Though not shown, a magnetically anisotropic region which extends parallel with the axis of the shaft 55 may be formed on the shaft 55, as in the case of the correcting magnetically anisotropic regions 14 and 15 shown in FIG. 1.

Third Embodiment

Figure 14:
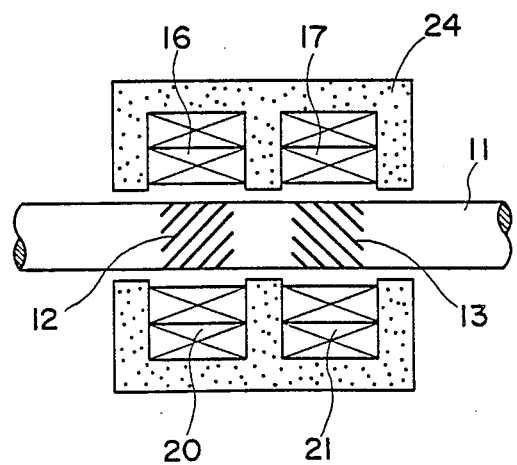
FIG. 14 is a view showing the principal portion of the shaft shown in FIG. 13 and periphery thereof.

In FIG. 14, the outer peripheral surface of the torque transmitting shaft 11 is formed with a pair of torque detecting magnetically anisotropic regions 12 and 13 alone, as in the second embodiment. Disposed around the respective outer peripheries of the magnetically anisotropic regions 12 and 13 are exciting coils 16 and 17. Similarly, disposed around the respective outer peripheries of these exciting coils 16 and 17 are detecting coils 20 and 21.

Figure 13:
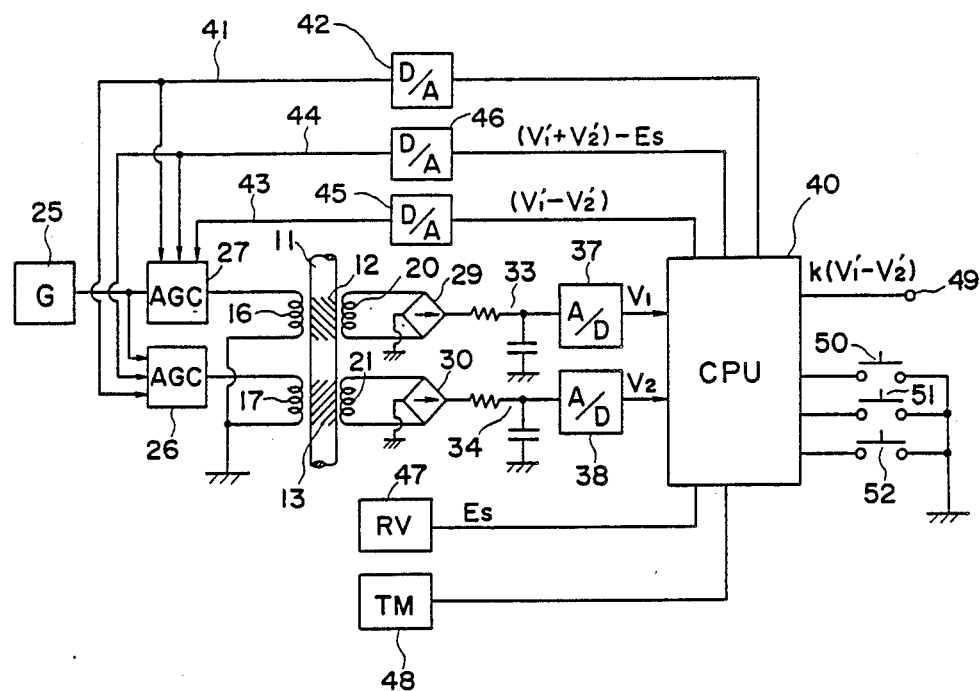
FIG. 13 is a view showing the arrangement of a torque measuring device according to a third embodiment of the invention.

FIG. 13 shows the detail of the entire device including an electronic circuit. In the figure, the numeral 25 denotes an oscillator, and 26 and 27 denote first and second power sources, these being the same as in the first and second embodiments. The exciting coil 16 is connected to the second power source 27, while the exciting coil 17 is connected to the first power source 26. The detecting coils 20 and 21 are connected to the CPU 40 respectively through rectifiers 29 and 30, filters 33 and 34, and AD converters 37 and 38.

A power source cut-off signal line 41 for cutting out the outputs of the two power sources 26 and 27 is connected to the CPU 40 together with a DA converter 42.

Also connected to the CPU 40 are power source control signal lines 43 and 44 for adjusting the amplification factors of power amplifiers constituting said two power sources 26 and 27 to adjust their outputs. The numerals 45 and 46 denote DA converters placed in the signal lines 43 and 44. The numeral 47 denotes a reference value setting device which inputs into the CPU 40 a reference value Es which is set digitally or in a software manner using memory Also connected to the CPU 40 is a timing circuit 48 which generates operation timing for the present circuit. The numeral 49 denotes an output terminal for torque signals. The numerals 50, 51 and 52 denote manual switches.

The operation based on the above arrangement will now be described. The operation is the same as in the first and second embodiments described above in that when torque acts on the shaft 11, a torque indication value $k(V_1'-V_2')$ appears at the torque terminal 49. In this case also, for the sake of simplicity, a description of the zero point correction on the basis of the balance adjustment of the two detecting sections at the time of manufacture of the device is omitted.

Among the corrections of errors due to temperature changes and time-dependent changes, the zero point correction and sensitivity correction are the same as in the first and second embodiments; therefore, a description thereof is omitted.

Therefore, the balance correction of the two detecting sections will be described in detail.

Figure 5:
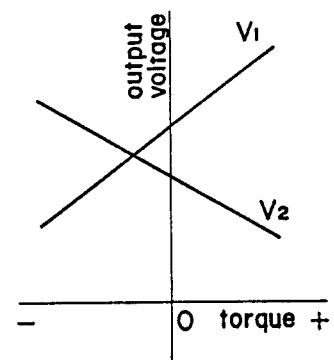
FIG. 5 is a graph showing detected voltages when the balance between the torque detecting regions is upset.

At this time, in the CPU 40, a decision is made on whether the torque load is 0 or in the vicinity of 0. This is effected by the CPU 40 comparing the value of the torque signal $k(V_1'-V_2')$ with the reference value. For example, 1% of the rated torque signal $k(V_1'-V_2')$ is set as the reference value $E_D$ and balance correction is made possible when the value of the torque signal $k(V_1'-V_2')$ is less than the reference value. And a control signal is fed to the second power source 27 via a power source control signal line 43 to adjust the power source 27 so that $V_1'-V_2'=0$; thus, the balance between $V_1'$ and $V_2'$ is corrected. As a result, the graphs in which the balance is upset as shown in FIGS. 5 and 6 are corrected to the graphs shown in FIGS. 3 and 4, as in the case of the first embodiment.

The reason why the balance correction should be made only when the value of the torque signal $k(V_1'-V_2')$ is 0 or less than 1% of the rated torque is that when torque is acting on the shaft 11, since torque components are included in the signals $V_1'$ and $V_2'$ (see FIGS. 3-6), the balance correction cannot be made. The reason for less than 1% of the rated torque is that normally when any torque is imposed on the shaft 11, a torque signal of above at least a certain level should naturally be outputted in view of mechanical efficiency; it may safely be said that within the range of 1%, there is substantially no torque. When the value of the torque signal $k(V_1'-V_2')$ is above 1% of the rated torque, no balance correction will be made.

The aforesaid zero point correction, sensitivity correction and balance correction are made in the same manner as in the first and second embodiments according to the timing shown in FIG. 9. The arrangement is also the same in that manual switches 50, 51 and 52 are provided for making said corrections according to the need.

Fourth Embodiment

Figure 16:
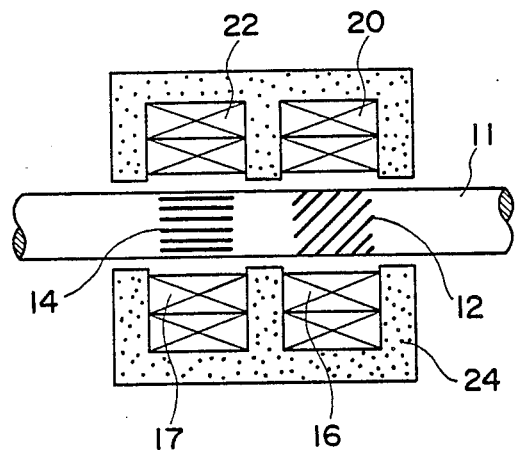
FIG. 16 is a view showing the principal portion of the shaft shown in FIG. 15 and periphery thereof.

In FIG. 16, the outer peripheral surface of a shaft 11 is provided with a torque detecting magnetically anisotropic region 12 forming an angle with respect to the axis of the shaft 11, and with a correcting magnetically anisotropic region 14 which is located in the vicinity of said detecting magnetically anisotropic region 12 and extending parallel with the axis. Exciting coils 16 and 17 are disposed around the magnetically anisotropic regions 12 and 14. Further, disposed around the outer peripheries of the exciting coils 16 and 17 are a detecting coil 20 corresponding to the torque detecting magnetically anisotropic region 12 and a correcting coil 22 corresponding to the correcting magnetically anisotropic region 14. The numeral 24 denotes a core.

Figure 15:
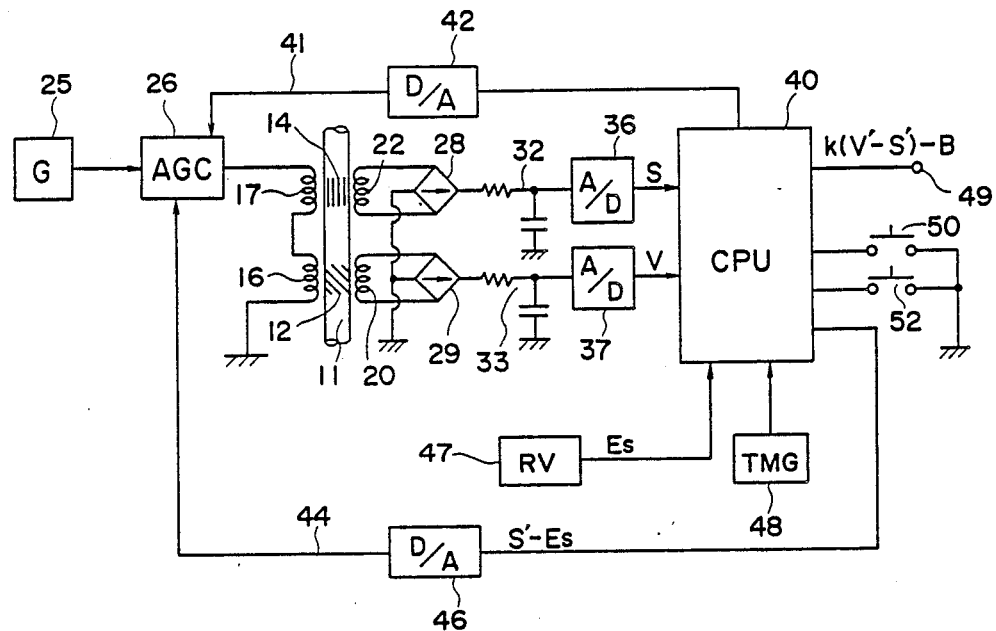
FIG. 15 is a view showing a torque measuring device according to a fourth embodiment of the invention.

FIG. 15 shows the entire arrangement of the present device including an electronic circuit. In this figure, the numeral 25 denotes an oscillator, and 26 denotes an AC power source. The exciting coils 16 and 17 are combined in series and connected to the power source 26. The detecting coil 20 and correcting coil 22 are connected to the CPU 40 respectively through rectifiers 29 and 28, filters 33 and 32, and AD converters 37 and 36. A power source cut-off signal line 41 for cutting off the output of the power source 26 is connected to the CPU 40 together with an DA converter 42. Further, a power source control signal line 44 for controlling the output of the power source 26 is connected to the CPU 40 through a DA converter 46. The numeral 48 denotes a timing circuit; 49 denotes an output terminal for torque signals; and 50 and 52 denote manual switches.

The operation based on the above arrangement will now be described. When the power is turned on, output voltages appear at the detecting coil 20 and correcting coil 22, said voltages having values V and S at the respective output sides of the AD converters 38 and 37, i.e., at the input side of the CPU 40.

With respect to these values V and S, as in the case of the first through third embodiments, with the output of the power source 26 turned off, zero point correction is made and these values are arithmetically processed to provIde values V' and S'.

In this condition, however, the indication value $k(V_1'-V_2')$ obtained after re-throwing (returning) the power source 26 does not necessarily indicate zero, even if there is no torque. The reason is that the detecting and correcting sections are not necessarily magnetically balanced. Thus, when it is known that there is no torque (as when the present device is adjusted for the first time or the shaft 11 is not being driven), the manual switch 50 for manual zero point adjustment is operated. Thereupon, a signal from the switch 50 is taken into the CPU 40, where the torque indication value B at the terminal 49 is subtracted from said indication value $k(V'-S')$ to make the output from the terminal 49 zero. This value B is stored in the CPU 40 until the next manual correction is made. Thereafter, the value $K(V'-S')-B$ is used as the indication value. Such processing corresponds to the "balance correction"]in the first through third embodiments in that the operation is manual.

Next, sensitivity correction is made. If the characteristics of the device change owing to temperature changes or the like, the signals V' and S' vertically displace as indicated by two-dot-and-dash lines in FIG. 17 (the zero point correction value B being omitted), and the gradient of the calibrated value V' based on the signal from the detecting coil 20 also changes. As a result, the angle of inclination of the torque signal T indicated by $k(V'-S')$ changes.

Thus, by increasing or decreasing the level of the output from the power source 26 by the power source control signal line 44 while simultaneously increasing or decreasing the exciting voltages for the exciting coils 16 and 17, control is effected so that the calibrated value S' based on the signal from the correcting coil 22 is equal to the set value Es inputted into the CPU 40 by the reference value setting device 47, that is, so that $S'-Es=0$. Thereby, the values V' and S' shown in two-dot and-dash lines in FIG. 17 are corrected to the values shown in solid lines, with the gradient of the calibrated value V' restored to the predetermined state; thus, the torque measuring sensitivity is corrected.

Figure 17:
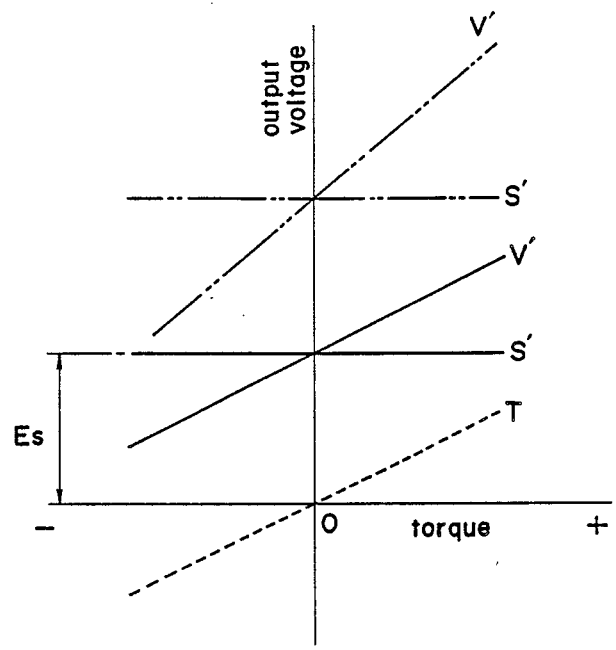
FIG. 17 is a graph showing, by way of example, detected voltages obtained by the device shown in FIG. 15.

Since the correcting magnetically anisotropic region 14 is formed to extend parallel with the axis of the shaft 11, the calibrated value S' based on the output of the correcting coil 22 is constant as shown in FIG. 17 irrespectively of the amount of the torque. Therefore, the torque measuring sensitivity can be corrected irrespectively of the presence or absence and the amount of the torque.

Figure 18:
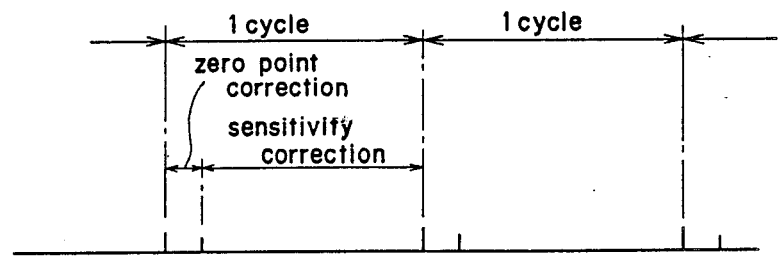
FIG. 18 is an operation timing chart for the device of FIG. 15.

FIG. 18 shows an operation timing for the circuit shown in FIG. 15, said timing being similar to the one shown in FIG. 9. However, only the zero point correction and sensitivity correction are automatically made by the CPU 40, as described above.

In the case where manual correction is to be made by using the manual switch 52 for sensitivity correction, this can be made by applying the rated torque to the shaft 11 by a lever and a weight and adjusting the reference value setting device 47 so that the prevailing indication value is equal to the rated value.

The electronic circuit described in the preceding embodiments may be used with some of the functions of said circuit omitted. For example, only the circuit for controlling the zero point, the circuit for controlling the sensitivity or the circuit for controlling the balance may be utilized. These circuits are suitable where it is desired to control only changes in the zero point with high accuracy, where it is desired to control the sensitivity with high accuracy though allowing coarse control of the zero point, or in other cases. Such arrangement is advantageous in that the control circuit and control process can be simplified. An analogue electronic circuit which does not contain CPU can also be utilized.

What is claimed is:

1. A device for measuring torque acting on a shaft, comprising:
    torque detecting means having first and second torque detecting magnetically anisotropic regions formed on the outer peripheral surface of a torque transmitting shaft and provided with magnetic anisotropy such that the regions are inclined in opposite directions to form angles with respect to the axis of rotation of said shaft, and first and second detecting coils capable of detecting changes in permeability in the torque detecting magnetically anisotropic regions, and
    correcting means having a correcting shaft separate from said torque transmitting shaft and free from load, and first and second correcting coils installed around the correcting shaft,
    wherein said correcting means having substantially &he same magnetic properties as said torque detecting means and installed in the vicinity of said torque detecting means.

2. A device as set forth in claim 1, wherein:
    the correcting shaft has first and second correcting magnetically anisotropic regions on outer peripheral surface thereof which are inclined in opposite directions to form angles with respect to the axis of said correcting shaft, and
    the first and second correcting coils are installed along the periphery of said first and second magnetically anisotropic regions.

3. A device as set forth in claim 1, wherein the correcting means is installed in a place where the temperature and other environmental conditions are substantially the same as those for the torque detecting section.

4. A device as set forth in claim 1, including:
    exciting coils provided for respective detecting coils and correcting coils,
    wherein the exciting coil for the first detecting coil and the exciting coil for the first correcting coil being combined in series and connected to a first AC power source, and
    wherein the exciting coil for the second detecting coil and the exciting coil for the second correcting coil being combined in series and connected to a second AC power source.

5. A device as set forth in claim 4, including:
    means for cutting off the outputs of the first and second power sources with suitable timing during torque measurement,
    means for finding measured values provided by the first and second detecting coils and first and second correcting coils when said power sources are cut off, and
    means for calibrating measured data by subtracting the readings in the two detecting coils and two correcting coils when said AC power sources are cut off from the measured values provided by said coils when the cut off of said AC power sources is canceled.

6. A device as set forth in claim 5, including means for controlling one of the power sources so that the calibrated values of the measured data provided by the two correcting coils are equal.

7. A device as set forth in claim 5, including means for controlling the two power sources so that the sum of the calibrated values of the measured data provided by the two detecting coils is a constant reference value.

8. A device as set forth in claim 4 including means for actuating with constant timing one of the following three included means or two or more thereof serially:

means for calibrating the measured data provided by the two detecting coils, means for controlling one of the power sources so that the calibrated values of the measured data provided by the two correcting coils are equal, and means for controlling the two power sources so that the sum of the measured data provided by the two detecting coils is a constant reference value.

9. A device as set forth in claim 8, including manually initiable means for actuating at least one of said three means at any time irrespectively of the constant timing.

* * * * *

UNITED STATES PATENT AND TRADEMARK OFFICE
CERTIFICATE OF CORRECTION

PATENT NO. : 4,972,727

DATED : November 27, 1990

INVENTOR(S) : Shigeo Yoshimura et al.

It is certified that error appears in the above-identified patent and that said Letters Patent is hereby corrected as shown below:

Column 2, line 65, "region" should read --regions--

Column 3, line 17, "detectIng" should read --detecting--

Column 3, line 17, "regIon" should read --region--

Column 4, line 13, "&he" should read --the--

Column 4, line 42, "12" should read --11--

Column 4, line 55, "anIsotropic" should read --anisotropic--

Column 5, line 26, "constitutIng" should read --constituting--

Column 5, line 35, "60" should read --50--

Column 5, line 36, "61" should read --51--

Column 5, line 68, "&he" should read --the--

Column 6, line 7, " $\varepsilon 1$ " should read -- $\delta 1$ --

Column 6, line 7, " $\varepsilon 2$ " should read -- $\delta 2$ --

Column 6, line 21, "6" should read --5--

Column 6, line 68, "Values" should read --values--

Column 7, line 33, "&he" should read --the--

Column 7, line 39, after "reference" first occurence, insert --torque is applied to the shaft 11 as by a lever and a weight--

Column 8, line 14, "respec&" should read --respect--

Column 8, line 15, "58" should read --55--

UNITED STATES PATENT AND TRADEMARK OFFICE
CERTIFICATE OF CORRECTION

PATENT NO. : 4,972,727

DATED : November 27, 1990

INVENTOR(S) : Shigeo Yoshimura, et al.

It is certified that error appears in the above-identified patent and that said Letters Patent is hereby corrected as shown below:

Column 8, line 17, "66" should read --56--

Column 10, line 58, "38" should read --36--

Column 10, line 64, "provIde" should read --provide--
Column 11, line 13, "]in" should read --in--
Column 12, line 21, "&he" should read --the--

Signed and Sealed this

Thirty-first Day of March, 1992

Attest:

HARRY F. MANBECK, JR.

*Attesting Officer*     *Commissioner of Patents and Trademarks*